United States Patent
Romanowich et al.

(10) Patent No.: US 6,495,981 B2
(45) Date of Patent: Dec. 17, 2002

(54) MOTORIZED ACTUATOR WITH A VARIABLE STALL LEVEL

(75) Inventors: Gary A. Romanowich, Wauwatosa, WI (US); Lawrence J. Strojny, Oostburg, WI (US); Gerald A. Duenkel, Grafton, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 10 days.

(21) Appl. No.: 09/781,648

(22) Filed: Feb. 12, 2001

(65) Prior Publication Data

US 2002/0109473 A1 Aug. 15, 2002

(51) Int. Cl.$^7$ ............................................. H02H 7/085
(52) U.S. Cl. ..................... 318/434; 318/466; 318/471
(58) Field of Search ............................. 318/430–434, 318/445, 452, 466–469, 471, 484; 388/903, 921, 930, 934

(56) References Cited

U.S. PATENT DOCUMENTS 4,227,664 A * 10/1980 Skutecki
5,234,057 A * 8/1993 Schultz et al.
6,249,100 B1 * 6/2001 Lange .......................... 318/471

* cited by examiner

Primary Examiner—Bentsu Ro
(74) Attorney, Agent, or Firm—Foley & Lardner

(57) ABSTRACT

An actuator for an HVAC system includes a motor coupled by a gear train to an output connector. A spring coupled to the gear train stores energy when the motor is driven in one direction and releases stored energy when the motor is driven in the opposite direction. The spring returns the output connector to a normal position in the event that electrical power is lost. A motor stall current threshold for the motor is determined dynamically in response to operation of the actuator. The position of the spring, direction of motion and the temperature are sensed. The motor stall current threshold value is selected from a table in response to the values of the sensed operating parameters. A determination is made that the motor has stalled when the electric current applied to the motor exceeds the selected motor stall current threshold value.

15 Claims, 2 Drawing Sheets

MOTORIZED ACTUATOR WITH A VARIABLE STALL LEVEL

BACKGROUND OF THE INVENTION

The present invention relates to motorized actuators, such as used to operate valves and dampers in a heating, ventilation, and air conditioning system; and more particularly to mechanisms for detecting when the actuator stalls.

Electrically powered actuators are commonly used to open and close valves and airflow dampers in heating, ventilation and air conditioning (HVAC) systems. A typical bidirectional actuator has an output connector that moves ninety degrees to drive the valve or damper between fully open and fully closed positions. These actuators usually include an electric motor which is connected by a gear train to the valve or damper. This allows a low torque motor to operate a relatively large load. The motor can be operated to place the valve or damper in a number of positions between the extreme open and closed limits. The voltage or current level of an analog input signal indicates the desired position.

It is important in many installations that the device operated by the actuator assume a predefined (normal) position in the event that electrical power to the actuator is lost. For example, it often is desired that an outside air damper in an HVAC duct close when electrical power is lost to prevent pipes and equipment from freezing. This return-to-normal feature is provided by a return spring which winds as the actuator moves the valve or damper into an open position, thereby storing energy in the spring. The spring unwinds as the actuator closes the valve or damper. When the motor stops, its a reduced level "hold" current through the motor winding provides torque that when amplified by the gear train prevents the return spring energy from moving the actuator. When power is lost, a clutch decouples the motor from the gear train allowing the spring to operate the actuator.

A given actuator model is specified as providing a minimum amount of output torque. Manufacturing and component tolerances affect the actual torque produced by a particular actuator. The torque required to operate the actuator also varies as a function of temperature which varies the mechanical resistance to movement, the degree to which the return spring is wound (e.g. more torque is required when the spring is wound-up than when relaxed), and the direction of movement (i.e. whether the spring is aiding or resisting actuator motion). Therefore, in order that every actuator of a given model will meet the minimum output torque specification over its full range of motion and operating temperatures, the actuator is designed to produce a much higher torque level. As a result some actuators will have tolerances that yield an actual torque level that is greatly above the design level, for example as much as twice the specified minimum output torque.

This creates a problem in that when the device driven by the actuator reaches the end of its travel, the actuator will continue to apply force to the device until the torque rises to a level at which a stall detector trips and deactivates the actuator motor. The stall torque threshold must be set relatively high to accommodate high torque levels produced in a worst case combination of the values of the parameters affecting movement. As a consequence, a particular actuator may apply a very high torque to the driven device before shutting off, which over time can have significant adverse affects on that device and the actuator.

Therefore, it is desirable to provide a mechanism for dynamically varying the stall torque threshold as a function of the parameters that affect the torque required to operate the actuator.

SUMMARY OF THE INVENTION

The present invention is particularly suited to control an actuator that has a motor which is selectively driven in two directions by an electric current and which is coupled by a transmission to an output connector. A spring which is connected to either the motor, the transmission or the output connector, stores energy when the motor is driven in one direction and releases the stored energy when the motor is driven in another direction.

The present control technique derives a relationship between a motor stall current threshold and at least one actuator operating parameter in a group consisting of the position of the spring, the direction in which the motor is being driven, and the temperature of the actuator. The present value of each parameter of the relationship is sensed and employed using the relationship to determine a stall current threshold value. In the preferred embodiment, the relationship is expressed as a table of motor stall current threshold values stored in a memory of a controller for the actuator. The sensed values for the position of the spring, direction in which the motor is being driven, and temperature are used to address a particular entry in that table which entry then is used as the stall current threshold value.

The magnitude of electric current flowing through the motor is sensed and compared to the selected stall current threshold value. A determination is made that the motor has stalled in response to that comparison. For example, a conclusion is made that the motor has stalled when the electric current flowing through the motor exceeds the stall current threshold value.

DETAILED DESCRIPTION OF THE INVENTION

Figure 1:
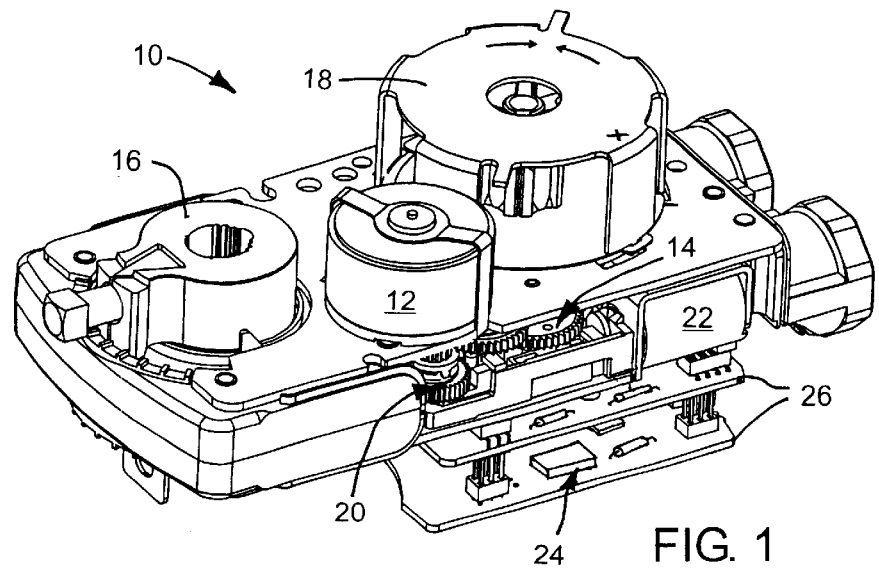
FIG. 1 is an isometric view of an actuator the outer covers removed.

With initial reference to FIG. 1, an actuator 10 has an electric motor 12 which is coupled to a gear train 14 by a clutch 20 that is operated by a solenoid 22. Upon the application of electric current, the solenoid 22 engages the clutch 20 to mechanically couple the motor 12 to an initial stage of the gear train. The gear train 14 serves as a transmission which produces movement of an output connector 16 connected to the final stage. A device, such as a damper or a valve, can be connected to the output connector 16 which turns through approximately 90°, although other angles of travel can be provided. Depending on the direction of the motor's rotation the output connector 16 is moved either clockwise or counter-clockwise.

A coiled spring 18 also is connected to the gear train 14. As the gear train is driven in one direction, the coiled spring 18 is wound to store energy and movement of the gear train in the opposite direction unwinds the spring. As long as electricity is available to the actuator 10, the solenoid 22 is energized and the clutch 20 is engaged, thereby connecting the motor 12 through the gear train 14 to the output connector 16. The aggregate gear ratio of the gear train magnifies the detent or hold torque of the motor 12 which provides resistance that prevents the typical load force and the spring force from moving the output connector 16 when the motor is de-energized. When the clutch 20 disengages and the motor 12 is decoupled from the gear train 14, the energy stored in the spring 18 drives the output connector 16 into a normal position.

Figure 2:
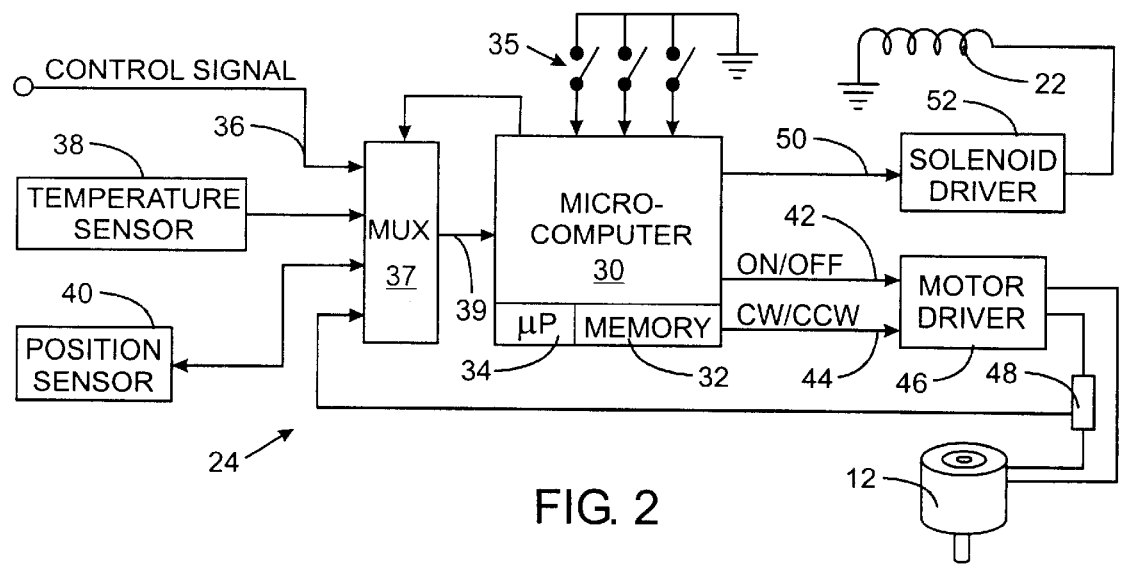
FIG. 2 is a block schematic diagram of the electronic control circuit for operating the actuator motor.

The design of the actuator 10 is exemplary and the present inventive concept may be applied to actuators of various designs. For example, the actuator may not have a coiled spring 18 if return to normal operation is not required Application of electricity to motor 12 is governed by a control circuit 24 on printed circuit boards 26. Referring to FIG. 2, the control circuit 24 includes a microcomputer 30 with a non-volatile memory 32 and a microprocessor 34 which respectively store and execute a control program directing operation of the actuator. A set of switches 35 configures various functions of the actuator operation. The control circuit 24 receives a control signal on input line 36 which specifies the desired position for the device being driven by the actuator. For example, the control signal may be a DC voltage between 0 and 10 volts with the voltage level indicating a desired position for the device driven by the actuator. A temperature sensor 38 measures the ambient temperature. Another sensor 40, such as a potentiometer, is connected to the gear train to provide a signal to the microcomputer 30 indicating the position of the output connector 16. Because the spring 18 is connected to the output connector by the gear train 14, the position sensor 40 also indicates the degree to which the spring is wound. The signals from components 36, 38 and 40 are applied to inputs of a multiplexer 37, which in response to a control signal from the microcomputer 30 selectively connects one of those input signals to an analog input 39 of the microcomputer. That analog input 39 is connected to an internal analog to digital converter which converts these input signals into a digital format for processing by the microprocessor 34.

The microcomputer 30 produces a pair of output signals on lines 42 and 44 indicating when the motor 12 should be activated and the direction in which the motor should rotate. Output lines 42 and 44 are connected to a conventional motor driver 46 which responds to their signals by controlling the application of electricity to the motor 12. A current sensor 48 produces a signal indicative of the magnitude of electric current flowing to the motor 12 and that signal is applied via the multiplexer 37 to the microcomputer 30. Another output line 50 from the microcomputer 30 carries a signal that controls a driver 52 for the clutch solenoid 22.

As described previously, the torque required to operate the actuator varies with temperature, degree to which the spring is wound, and the direction in which the actuator is moving. The effect that each of these parameters has on a particular actuator model can be determined empirically. For example, variation of the motor current over the working temperature range is measured while the actuator produces the specified minimum output torque. Measurements can be taken from a number of actuators of the same model and the values averaged. From the set of average values, an equation can be derived that relates the motor current to temperature. An equation characterizing the effect the degree to which the spring is wound has on the motor current to achieve the specified minimum output torque also is derived. This may be derived theoretically or empirically by measuring the motor current as a function of actuator position at a constant temperature. As noted previously the amount that the spring is wound is indicated by the position of the output connector. As noted previously the amount that the spring is wound is related to the position of the output connector 16. Measurements are taken for both clockwise and counter-clockwise movement of the actuator to develop separate sets of data for the two directions of motion.

From these equations, a three dimensional data table is developed specifying a stall current threshold value as a function of temperature, degree to which the spring is wound, and direction of movement. Specifically, each of the three parameters is an axis of the data table and can be used to index to a particular stall current threshold value. The extent to which the actual output torque is allowed to deviate from the minimum output torque specified for this actuator model is determined by the resolution of the data table, that is the number of locations along each axis. For a 90° actuator, a significant improvement has been realized in which the table axis for the spring position has only two values: one for position is between 0° and 45° and another when the position is between 45° and 90°. The temperature table axis in this embodiment is divided into three ranges $-40°$ C. to $-20°$ C., $-20°$ C. to 0° C., and 0° C. to $+60°$ C. for the operating temperature range of the particular actuator. However other increments for both position and temperature can be used. The three dimension data table is stored in the memory 32 during manufacture of the actuator.

Figure 3:
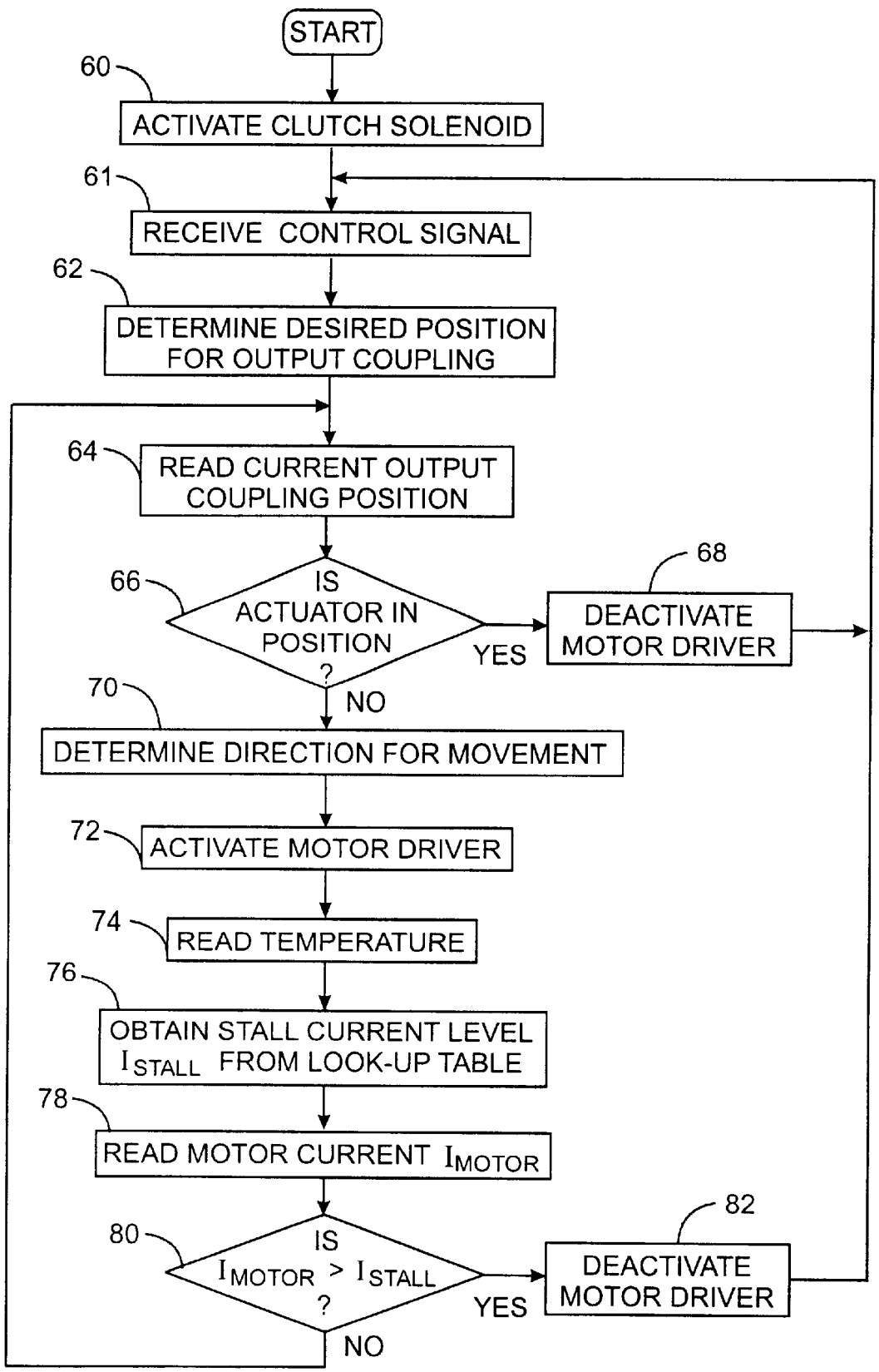
FIG. 3 is a flowchart of the operation of the electronic control circuit.

Referring to the schematic diagram of FIG. 2 and the flowchart of FIG. 3, operation of the actuator commences at step 60 where the solenoid driver 52 is activated to energize solenoid 22 and engage clutch 20. At step 61, a control signal is received on line 36 and the level of this signal indicates the desired position to which actuator is to move the device connected to the output connector 16. The microcomputer 30 converts that control signal level at step 62 into the desired position for the output connector 16. Then the present position of the output connector 16 is determined by reading the signal from the position sensor 40. This is accomplished at step 64 by the microcomputer 30 sending a signal to the multiplexer (MUX) 37 which selects the signal from the position sensor 40 to apply to the analog input 39. The microcomputer then converts the position sensor signal into the corresponding position of the output connector. At step 66, the desired position is compared to the present position to determine whether the output connector already is properly positioned. If that is the case, the program branches to step 68 at which an output signal is sent via line 42 to deactivate the motor driver 46 in the event that it was previously activated.

When the output connector 16 is not in the desired position, the program advances to step 70 at which the microcomputer 30 determines whether the output connector 16 has to be rotated clockwise or counter-clockwise from the present position to reach the desired position. Then at step 72 signals are sent via lines 42 and 44 to the motor driver 46 to activate the motor 12 in the respective direction.

Next the microcomputer 30 reads the present temperature from the temperature sensor 38 at step 74. The temperature, the present position of the output connector and the direction of movement are all used at step 76 to access an entry in the three dimensional data table which contains the motor stall current threshold values. Thus operation of the actuator dynamically selects a motor stall current threshold to use at a given point in time that is based on the operational parameters of temperature, output connector position and direction of movement. Therefore, as the return spring 18 is being wound and more torque is required for that operation as well as to move the driven device, the motor stall current threshold is set at a greater level than when the output connector is moving in the opposite direction at which the spring is assisting that movement.

The microcomputer 30 then determines the present level of the motor current from the current sensor 48 at step 78. Next a determination is made at step 80 whether the present motor current is greater than the motor stall current value. If that is the case, a conclusion is reached that the motor has stalled and the motor driver 46 is deactivated by a signal on line 42 at step 82. The actuator operation then returns to step 61 to again process the control signal. If at step 80 the present motor current is not greater than the motor stall current value, the motor will continue to run and the program returns to step 64.

In addition to the stall current threshold being selected in response to the actuator position, direction of motion and temperature, other operating parameters may also be used. For example, the amount that the actuator has been operated also affects the torque required to move its components and thus the current level that has to be applied to the motor. Thus a timer implemented in the software executed by the microcomputer 30 can be used to measure the amount of time that the motor is operated. The amount of time can be used as a fourth dimension of the table that contains the stall current threshold values. Therefore, selection of a stall current threshold value from the table also is a function of the amount of actuator operating time.

We claim:

1. A method of determining when an actuator has stalled, the actuator having a motor that is driven by an electric current and is coupled to an output connector, the method comprising:

defining a relationship which specifies how a motor stall current threshold value varies as a function of changes in an operating parameter of the actuator;

sensing a present value of the operating parameter;

employing the present value of the operating parameter and the relationship to determine a present motor stall current threshold value;

sensing a magnitude of the electric current flowing through the motor;

comparing the magnitude of the electric current to the present motor stall current threshold value; and determining that the motor has stalled in response to the comparing.

2. The method as recited in claim 1 wherein a determination that the motor has stalled is made when the magnitude of the electric current exceeds the present motor stall current threshold value.

3. The method as recited in claim 1 wherein defining a relationship comprises storing a table having a plurality of storage locations each containing a motor stall current threshold value wherein each storage location has an address that is derived from values for the operating parameter of the actuator.

4. The method as recited in claim 1 wherein the operating parameter of the actuator is a position of a spring which is coupled to the output connector.

5. The method as recited in claim 1 wherein the operating parameter is the temperature of the actuator.

6. The method as recited in claim 1 wherein the operating parameter indicates a direction in which the output connector is moving.

7. The method as recited in claim 1 wherein the present motor stall current threshold value also is determined in response to an amount of time that the actuator has been operated.

8. A method of determining when an actuator has stalled, the actuator having a motor that is selectively driven in two directions by an electric current and is coupled to an output connector by a transmission, a spring connected to one of the motor, transmission and output connector and storing energy when the motor is driven in one direction and releasing stored energy when the motor is driven in another direction, the method comprising:

deriving a relationship between a motor stall current threshold value and at least one parameter in a group consisting of a position of the spring, direction in which the motor is being driven, and temperature of the actuator;

sensing a present value for each parameter of the relationship;

employing present values for each parameter and the relationship to determine a motor stall current threshold value;

sensing a magnitude of the electric current flowing through the motor;

comparing the magnitude of the electric current to the motor stall current threshold value; and determining that the motor has stalled in response to the comparing.

9. The method as recited in claim 8 wherein a determination that the motor has stalled is made when the magnitude of the electric current exceeds the motor stall current threshold value.

10. The method as recited in claim 8 wherein deriving a relationship comprises storing a table having a plurality of storage locations each containing a motor stall current threshold value wherein each storage location has an address that is derived from values for each parameter of the relationship.

11. The method as recited in claim 8 wherein the motor stall current threshold value also is determined in response to an amount of time that the actuator has been operated.

12. A method of determining when an actuator has stalled, the actuator having a motor that is selectively driven in two directions by an electric current and is connected to an output connector by a transmission, a spring coupled to the transmission to store energy when the motor is driven in one direction and release stored energy when the motor is driven in another direction, the method comprising:

sensing a position of the spring;

sensing temperature of the actuator;

selecting a motor stall current threshold value in response to the position of the spring, direction in which the motor is being driven and the temperature;

sensing a magnitude of the electric current flowing through the motor;

comparing the magnitude of the electric current to the motor stall current threshold value; and determining that the motor has stalled in response to the comparing.

13. The method as recited in claim 12 further comprising defining a table of motor stall current threshold values; and wherein the selecting a motor stall current threshold value comprises using the position of the spring, direction in which the motor is being driven and the temperature to choose a motor stall current threshold value from the table.

14. The method as recited in claim 12 wherein selecting a motor stall current threshold value also is in response to an amount of time that the actuator has been operated.

15. The method as recited in claim 12 wherein a determination that the motor has stalled is made when the magnitude of the electric current exceeds the motor stall current threshold value.

* * * * *